Nov. 29, 1927.
D. M. SOLENBERGER
PISTON RING
Filed Jan. 25 1926
1,651,163
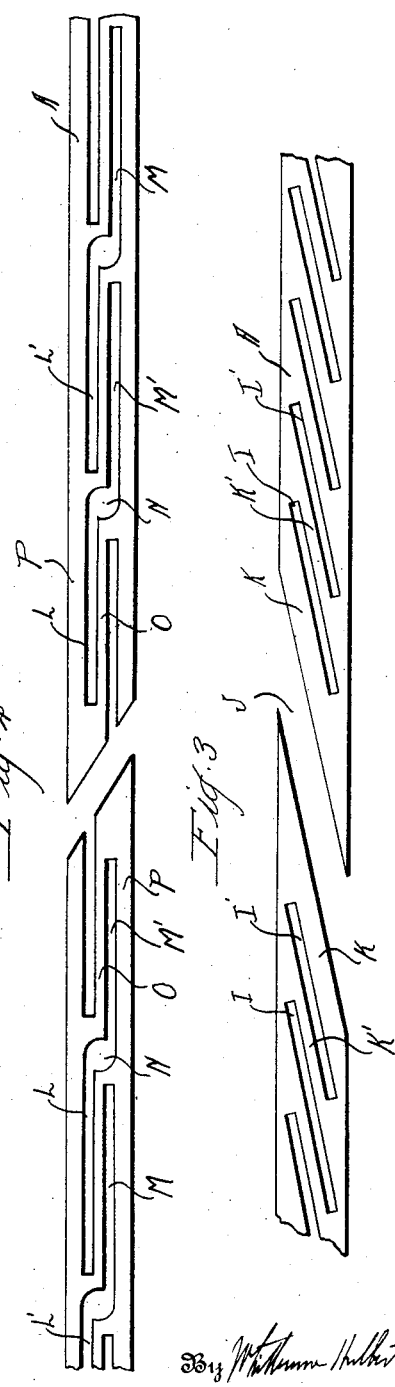
Inventor
Dean M. Solenberger Patented Nov. 29, 1927.

1,651,163

UNITED STATES PATENT OFFICE.

DEAN M. SOLENBERGER, OF CLEVELAND, OHIO, ASSIGNOR TO SIMPLEX PISTON RING COMPANY, OF CLEVELAND, OHIO, A CORPORATION OF OHIO.

PISTON RING.

Application filed January 25, 1926. Serial No. 83,714.

The invention relates to piston or sealing rings of that type in which the ring is transplit for radial flexibility and is circumferentially slotted for axial flexibility.

In the present state of the art various constructions of rings of this type have been used which however, have not proven equally effective in sealing. I have discovered that an important factor in obtaining proper sealing action is the regulation of the axial pressure of the ring against the side walls of the groove and particularly in maintaining substantially uniform pressure in all portions of the ring. Thus where the axial pressure is limited, there will be greater freedom of action for radial expansion and contraction and for conforming to irregularities in the cylinder wall. On the other hand, if the axial pressure is too low, the ring or some portion thereof will collapse sufficiently to permit leakage around the same. This is particularly true of the end portions of the ring on opposite sides of the transverse split which frequently fail where the body portion maintains its seal.

It is the object of the present invention to overcome such defects and to this end the invention consists in a construction in which each portion of the ring exerts substantially equal pressure against the side wall of the groove.

The invention further consists in the means for compensating for the weakening in axial pressure due to the split of the ring whereby the end portions on opposite sides of the split exert an axial pressure equal to that on the intermediate portions.

In the drawings;

Figure 1 is a diagram indicating a side elevation of the ring as developed in a plane.

Figure 2 is an enlarged elevation of portions of the ring on opposite sides of the transverse split showing a slightly modified construction.

Figures 3 and 4 are similar views showing other modifications.

Figure 5 is a section through a piston showing the ring applied thereto.

My improved ring can be made of any suitable material having the requisite strength and resiliency and other necessary characteristics but preferably I employ for this purpose cast iron. The ring is first machined, ground or otherwise fashioned to the desired radial dimensions and to a width which is somewhat in excess of the width of the groove for which it is designed. It is then slotted circumferentially to form a series of staggered overlapping slots with intermediate flexible bars so proportioned in length and thickness as to obtain a predetermined resiliency and tension. If the ring were circumferentially continuous the arrangement of a plurality of series of slots of equal length staggered in alternate series would produce substantially uniform pressure, but inasmuch as the ring is transplit, the conditions are not uniform. Thus, in a central portion of the ring intermediate the split the overlapping slots will produce intermediate bars which are anchored or rigidly connected at their opposite ends to the same side of the ring and are centrally connected to the opposite side thereof. On the other hand in the portions of the ring adjacent to and on opposite sides of the split one of said bars is centrally severed so that it produces in effect two cantilevers. Therefore with a uniform cross section these cantilevers will be less rigid per unit of length than the bars which are anchored at opposite ends.

To correct this defect, I have modified the construction of the end portions of the ring on opposite sides of the split so as to slightly increase the rigidity thereof to correspond to that of the other portions of the ring. Preferably this is accomplished by shortening the length of the flexible bars although the same result can be obtained by increasing the width of said bars.

In a ring which is transplit it is desirable to have overlapping ends, first to avoid wearing a ridge in the cylinder wall by the gap in the ring and second to seal the joint. This overlapping of the ends complicates the problem of obtaining equal resiliency in all parts of the ring and I have therefore devised a construction in which the opposite end portions are symmetrical and of equal resiliency with the intermediate portions.

Where the resiliency of the ring is obtained by a double row of overlapping slots staggered in relation to each other, the central bars between said slots are preferably made of less cross section than the bars or portions of the ring outside of the slots so as to have greater flexibility. However, the outer bars are also flexible to a less extent so as to be conformable to irregularities in the ring groove and it is one of the features of my invention to maintain substantially uniform tension in all portions of these outer bars including those which are immediately adjacent to the split.

In detail A is a ring transplit at B and preferably provided with overlapping ends. C and D are parallel series of slots in staggered relation to each other and with unslotted portions E between adjacent slots of the same series. The location of these slots is such as to form between the two series flexible resilient bars F which are less in cross section than the bars G between said slots and the outer side faces of the ring. Thus when axially compressed the central bars F will be flexed to the greatest extent while the outer bars G will only bend sufficiently to conform to any irregularities in the ring groove.

To compensate for the weakening or lessening in rigidity caused by the split, the bars F', G' immediately adjacent to said split on opposite sides thereof, are preferably less in length than corresponding bars in the intermediate portion of the ring. Thus, as shown in Figure 1 the ends of the ring on the opposite side of the split are formed with overlapping tongues H engaging corresponding rabbets H' and the shortened outer bars G' are adjacent to the rabbets. This produces a symmetrical arrangement so that the bars G' are of equal length and sufficiently shorter than the bars G to compensate for the split. The bars F' are also shortened over the bars F to the proper extent.

As shown in Figure 2 instead of tongues and rabbets the ring is provided with a diagonal split thereby producing overlapping portions but not completely sealing the joint. In this construction also the outer bars G' are shortened by the diagonal split so as to be of the proper relative length to the bars G and the bars F' are correspondingly shortened over the bars F. In Figure 3 a series of slots I, I' etc., are arranged to extend obliquely circumferentially of the ring so as to overlap each other and the split J is also oblique. With this construction the end portions opposite the sides of the split may be reinforced by slightly increasing the width of the bars K over that of the bars K' between the other slots I, I'.

In Figure 4 the slots L, L' of one circumferential series are cross connected with slots M, M' of a parallel series by means of radial bores N. The end portions of the ring may be reinforced by diminishing the length of the central bars O adjacent to the split and by making the split oblique as shown, the outer bars P are correspondingly shortened.

With all of the various modifications illustrated as well as with other modifications which might be made, compensation is provided for the weakening caused by the split so that all portions of the ring axially compressed will exert a substantially uniform axial pressure which is preferably the minimum requirement for preventing collapse.

My improved ring is also designed for extreme radial flexibility which is secured by a decrease in the radial thickness. This necessitates additional means for resiliently expanding the ring radially preferably a corrugated ribbon expander N' which is arranged in the ring groove O' as shown in Figure 5.

What I claim as my invention is:

1. A transplit sealing ring having a series of circumferentially extending overlapping slots, said slots being arranged to produce a series of resiliently flexible bars proportioned to produce in the portions of the axially compressed ring on opposite sides of the split, an axial tension substantially equal to that in the intermediate portions of the ring.

2. A transplit sealing ring provided with a series of circumferentially extending overlapping slots producing a series of resiliently flexible bars, the bars on opposite sides of the split which are in effect cantilevers, being shortened to produce therein when the ring is axially compressed, a tension substantially equal to that produced by the intermediate flexible bars.

3. A transplit sealing ring provided with parallel series of circumferentially extending slots the slots of one series being staggered in relation to those of another and forming a series of resiliently flexible bars, one of the slots of each series extending to the split and the bars adjacent to the split being shorter than those in the intermediate portions of the ring.

4. A transplit sealing ring provided with a parallel series of circumferentially extending slots, the slots of one series being staggered in relation to those of another and forming a series of resiliently flexible bars, the end slots of one series extending to the split in the portion of the ring on one side thereof and the end slots of the other series extending to the split in the portion of the ring on the opposite side thereof, thereby forming cantilever bars on opposite sides at opposite ends, said cantilever bars and also the central bars adjacent to the split being shorter than the bars in the intermediate portion of the ring.

5. A transplit sealing ring provided with a series of circumferentially extending overlapping slots forming between the slots flexible bars and on the outer sides of the slots bars of less flexibility, the ratio of the length to the cross section of the bars adjacent to and on opposite sides of the split being less than that of the corresponding bars in the intermediate portions of the ring whereby substantially uniform axial tension is maintained in all portions of the ring.

6. A transplit sealing ring provided with overlapping ends and being circumferentially slotted to form a series of resiliently flexible bars between said slots and on the outer sides thereof, the outer cantilever bars adjacent to the split being respectively on opposite sides of the ring and on the short side thereof.

In testimony whereof I affix my signature.

DEAN M. SOLENBERGER.